US010902554B2

(12) United States Patent
McEwen et al.

(10) Patent No.: US 10,902,554 B2
(45) Date of Patent: Jan. 26, 2021

(54) METHOD AND SYSTEM FOR PROVIDING AT LEAST A PORTION OF CONTENT HAVING SIX DEGREES OF FREEDOM MOTION

(71) Applicant: KAGENOVA LIMITED, Guildford (GB)

(72) Inventors: Jason D. McEwen, Guildford (GB); Christopher G. R. Wallis, Guildford (GB); Martin Ender, Guildford (GB); Mayeul D'Avezac, Greater London (GB)

(73) Assignee: Kagenova Limited, Guildford (GB)

( * ) Notice: Subject to any disclaimer, the term of this patent is extended or adjusted under 35 U.S.C. 154(b) by 0 days.

(21) Appl. No.: 16/402,701

(22) Filed: May 3, 2019

(65) Prior Publication Data

US 2020/0134779 A1     Apr. 30, 2020

(51) Int. Cl.
*G06T 3/00* (2006.01)
*G06T 7/194* (2017.01)
(Continued)

(52) U.S. Cl.
CPC ............ *G06T 3/0087* (2013.01); *G06F 3/011* (2013.01); *G06T 3/0093* (2013.01); *G06T 7/194* (2017.01); *G06T 15/20* (2013.01)

(58) Field of Classification Search
None
See application file for complete search history.

(56) References Cited

U.S. PATENT DOCUMENTS 10,469,968 B2 *  11/2019  Peters .................... G06F 3/012
10,595,004 B2 *   3/2020  Kim ..................... H04N 5/2226
(Continued)

FOREIGN PATENT DOCUMENTS

WO    WO 2016/017062 A1    2/2016

*Primary Examiner* — Ryan M Gray
(74) *Attorney, Agent, or Firm* — Sterne, Kessler, Goldstein & Fox P.L.L.C.

(57) ABSTRACT

The present invention provides a method for providing with at least a portion of content having six degrees-of-freedom in a virtual environment, comprising: receiving, by at least one processor, the portion of content for the virtual environment; associating, by the at least one processor, at least one of a first geometric shape and a second geometric shape with the portion of content; projecting, by the at least one processor, the portion of content onto a first point of a surface of the first geometric shape; determining, by the at least one processor, based on the projecting of the portion of content onto the first point, a first outcome relating to the portion of content at the first position; projecting, by the at least one processor, the portion of content onto a second point of the surface of the first geometric shape or of a surface of the second geometric shape, the second point being different than the first point; determining, by the at least one processor, based on the projecting of the portion of content onto the second point, a second outcome relating to the portion of content at a second position in the virtual environment, the second position being different than the first position; and reformatting, by the at least one processor and based on the first outcome and the second outcome, the portion of content to have six degrees-of-freedom providing rotational motion and positional motion in the virtual environment.

17 Claims, 3 Drawing Sheets

(51) Int. Cl.
    *G06F 3/01*        (2006.01)
    *G06T 15/20*     (2011.01)

(56) References Cited

U.S. PATENT DOCUMENTS

| | | | |
|---|---|---|---|
| 10,600,150 B2 * | 3/2020 | Kim | G06F 3/011 |
| 10,621,777 B2 * | 4/2020 | Dsouza | G06T 15/20 |
| 2018/0046356 A1 * | 2/2018 | Holzer | G06K 9/72 |
| 2018/0075653 A1 | 3/2018 | Schillings | |
| 2018/0234669 A1 * | 8/2018 | Chen | H04N 5/23238 |
| 2018/0234699 A1 | 8/2018 | Xu et al. | |
| 2018/0286109 A1 * | 10/2018 | Woo | H04N 19/543 |
| 2018/0329485 A1 * | 11/2018 | Carothers | G06T 7/536 |
| 2019/0230280 A1 * | 7/2019 | Kikukawa | H04N 13/111 |
| 2019/0238811 A1 * | 8/2019 | Xiu | H04N 19/46 |
| 2020/0027261 A1 * | 1/2020 | Briggs | H04N 13/383 |

\* cited by examiner

METHOD AND SYSTEM FOR PROVIDING AT LEAST A PORTION OF CONTENT HAVING SIX DEGREES OF FREEDOM MOTION

CROSS REFERENCE TO RELATED APPLICATIONS

This application claims priority to GB Application Number 1817454.0, filed Oct. 26, 2018, which is herein incorporated by reference in its entirety.

FIELD

The present invention relates to a method and system for providing at least a portion of content having six degrees-of-freedom motion.

BACKGROUND

With a new generation of virtual reality (VR) hardware becoming readily accessible recently (e.g. Google Cardboard, Google Daydream, Samsung Gear, HTC Vive, Oculus Rift), interest in VR experiences is growing rapidly. A wide range of VR experiences are available, ranging from viewing 360° photos and videos to computer generated imagery (CGI) of synthetic environments. While the former (360° content) are highly realistic since they are based on captured photographic content, they are not interactive. In contrast, while the latter (CGI synthetic environments) are typically interactive, they are often far from realistic.

Current 360° VR experiences allow the user to look around the scene but not to move within the scene. Technically, current experiences support the 3 degrees-of-freedom (DOF) of rotational motion only. The 3 DOF of positional (translational) motion that allow the user to move within a scene are not supported by current 360° experiences. This breaks the sense of presence provided by immersive 360° content. Supporting both rotational and positional motion results in 6 DOF motion, with 3 DOF from rotational motion and 3 DOF from positional (translational) motion.

Lack of support for 6 DOF also induces cyber motion sickness. One of the main causes of cyber motion sickness is sensory conflict. Sensory conflict occurs when the different senses of the body are not acting in harmony, as they usually are when experiencing the physical world, but rather are in conflict. The most common sensory conflict is visual-vestibular conflict. Visual-vestibular conflict occurs when the visual and vestibular (i.e. inner ear) sensory systems are in conflict. With current 360° VR systems, if the user moves in the physical world (e.g. leans or takes a step forward) the inner ear senses that motion but the corresponding motion is not reflected visually in the virtual environment. Since the vestibular system (inner ear) senses the motion but the visual system does not, the two systems are in conflict, which can induce cyber motion sickness.

Other approaches have sought to address the aforementioned problems. Two such approaches are outlined below.

Volumetric Capture

Volumetric capture approaches attempt to acquire full three dimensional volumetric information. Once full volumetric content is acquired, a scene can be re-rendered from any viewpoint, thus supporting 6 DOF motion. The effect of volumetric video is impressive but highly specialised photographic equipment is required to acquire volumetric information. The process of acquiring volumetric information can be time consuming and the data volumes are often extremely large. Volumetric capture devices require additional sensors and are very expensive. Volumetric approaches cannot be applied to content acquired by standard consumer or professional 360° cameras and cannot be used with pre-existing media and/or content where full three dimensional volumetric information is not available.

Reconstruction of Three Dimensional Geometry

An alternative approach is to attempt to recover the full three dimensional geometry of a scene and then use the recovered geometry to synthesize novel views of the scene. Geometry can be recovered from stereo correspondences. This can be achieved either with a stereo pair of cameras or with a moving camera for a static scene (a static scene is required within a moving camera so that correspondences can be recovered between frames of the scene). In Huang, Chen, Ceylan, Jin, 2017, IEEE Virtual Reality, 3744, https://ieeexplore.ieee.org/document/7892229/, a system is presented that supports 6 DOF by recovering geometry from a single moving 360° camera. The system not only supports 6 DOF but also synthesizes stereoscopic views. However, recovering full three dimensional geometry is a challenging problem and, as mentioned in Huang et al. (2017), the quality of the effect depends on the accuracy of the recovered geometry. Large holes in the geometry due to noise, textureless regions, occlusions and illumination changes, for example, induce problematic artifacts into the scene. Furthermore, the system requires a moving camera and hence cannot be applied to single 360° photos. The system also requires a static scene and hence cannot be applied to videos with dynamic scenes.

The present invention seeks to address the aforementioned problems by providing support for 6 DOF motion in existing immersive content to improve user experience and reduce instances and effect of nausea that can be caused by conflict between a user's vestibular and visual systems.

SUMMARY

An aspect of the invention provides a method for providing with at least a portion of content having six degrees-of-freedom in a virtual environment, comprising: receiving, by at least one processor, the portion of content for the virtual environment; associating, by the at least one processor, at least one of a first geometric shape and a second geometric shape with the portion of content; projecting, by the at least one processor, the portion of content onto a first point of a surface of the first geometric shape; determining, by the at least one processor, based on the projecting of the portion of content onto the first point, a first outcome relating to the portion of content at the first position; projecting, by the at least one processor, the portion of content onto a second point of the surface of the first geometric shape or of a surface of the second geometric shape, the second point being different than the first point; determining, by the at least one processor, based on the projecting of the portion of content onto the second point, a second outcome relating to the portion of content at a second position in the virtual environment, the second position being different than the first position; and reformatting, by the at least one processor and based on the first outcome and the second outcome, the portion of content to have six degrees-of-freedom providing rotational motion and positional motion in the virtual environment.

It is recognized that support for 6 DOF motion for immersive content viewed through VR headsets significantly reduces cyber motion sickness by eliminating visual-vestibular conflict. The prior art approaches outlined above either require acquisition of large amounts of volumetric data or re-creation of a full scene, typically through use of expensive video capture and processing equipment. Furthermore, the prior art approaches cannot be applied to certain content types or to pre-existing content. The present invention provides a solution that can be applied to existing immersive content by manipulating only the portion of the content that is to be immediately viewed by the user of a VR system. The data size is manageable by common consumer electronic devices such as mobile phones and personal computers. The method of the present invention can also be applied to existing content including 360° immersive content, 180° content, standard photographs and spatial audio.

Another aspect of the invention provides a system, comprising: a memory comprising instructions; and at least one processor coupled to the memory, wherein the instructions are configured to cause the processor to: receive at least a portion of content for a virtual environment; associate at least one of a first geometric shape and a second geometric shape with the portion of content; project the portion of content onto a first point of a surface of the first geometric shape; determine, based on the projection of the portion of content onto the first point, a first outcome relating to the portion of content at the first position; project the portion of content onto a second point of the surface of the first geometric shape or of a surface of the second geometric shape, the second point being different than the first point; determine, based on the projecting of the portion of content onto the second point, a second outcome relating to the portion of content at a second position in the virtual environment, the second position being different than the first position; and reformat, based on first outcome and the second outcome, the portion of content to have six degrees-of-freedom providing rotational motion and positional motion in the virtual environment.

Another aspect of the invention provides a tangible computer-readable device having instructions stored thereon that, when executed by at least one computing device, cause the at least one computing device to perform operations comprising: receiving at least a portion of content for a virtual environment; associating at least one of a first geometric shape and a second geometric shape with the portion of content; projecting the portion of content onto a first point of a surface of the first geometric shape; determining, based on the projection of the portion of content onto the first point, a first outcome relating to the portion of content at the first position; projecting the portion of content onto a second point of the surface of the first geometric shape or of a surface of the second geometric shape, the second point being different than the first point; determining, based on the projecting of the portion of content onto the second point, a second outcome relating to the portion of content at a second position in the virtual environment, the second position being different than the first position; and reformatting, based on the first outcome and the second outcome, the portion of content to have six degrees-of-freedom including rotational motion and positional motion in the virtual environment.

FIGURES

Aspects and embodiments of the invention will now be described by way of reference to the following figures.

DESCRIPTION

For the purposes of this description, it will be appreciated that content for use in a virtual environment can be created by a mobile phone, dedicated VR headset or other computing device, such as a games console, personal computer or tablet.

As illustrated in the figures, aspect of the present invention enable synthesizing of a novel version of an asset representing it as if it were acquired from a displaced position. By viewing synthesized versions of the original asset where the synthesized displacement is increased incrementally (along any path), the impression of positional motion in a scene is achieved. All references to asset include (but are not limited) to references to 360° and 180° media content as well as spatial audio and digital photographs.

The present invention synthesizes the displacement by considering the 360° asset represented on a geometric shape, potentially the surface of a sphere or a warped/distorted sphere (hereafter when referring to a spherical surface or spherical model we mean either the surface or model, respectively, of a sphere or a warped/distorted sphere). Note that the asset does not necessarily need to be explicitly mapped onto the (potentially warped/distorted) spherical surface. The synthesized version of the 360° asset that represents it as if it were acquired from a displaced position is constructed by a novel reprojective transformation of the spherical representation of the asset. Note that it is not necessary to synthesize the complete asset but only the region of it that is under observation by the user. This reprojective transformation exactly models the change in view that would occur in the infinitesimal limit of small motion (i.e. a small offset in position between the acquired and synthesized positions). As the size of the displacement increases, the transformation becomes increasingly approximate. Nevertheless, the effect is quite realistic, even for relatively large displacements. There are a variety of methods that can be used to realise this effect, two of which are outlined below. It will be appreciated that the two methods outlined below are not mutually exclusive. For example, in certain embodiments a reprojective approach can be combined with a positional camera model.

Spherical Projection

Figure 1A:
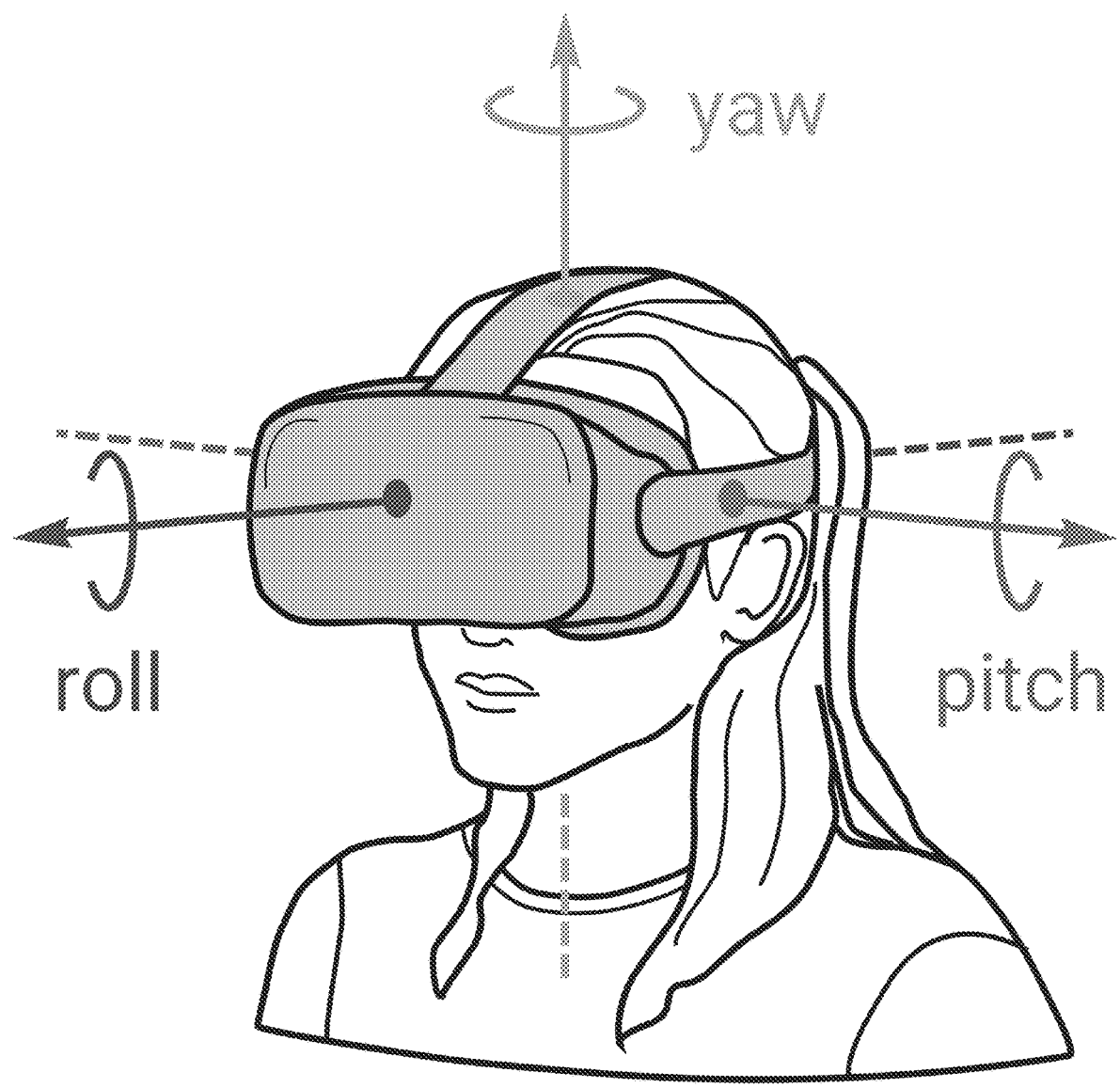
FIG. 1a illustrates a prior art VR system having 3DOF from yaw, pitch and roll motion.
Figure 1B:
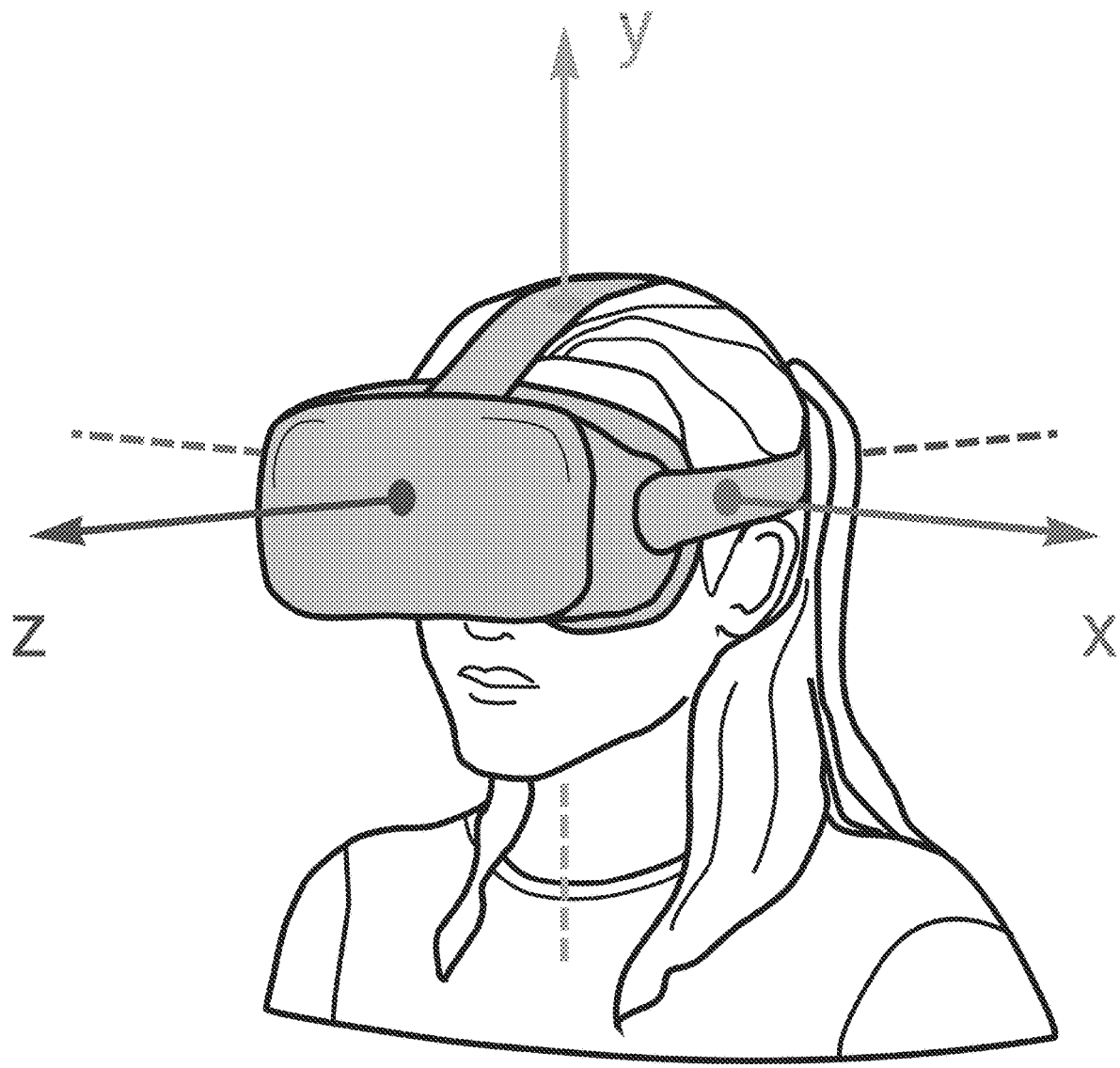
FIG. 1b illustrates an additional 3DOF of motion as provided for in the present invention through translational motion in the x, y and z dimensions.
Figure 2:
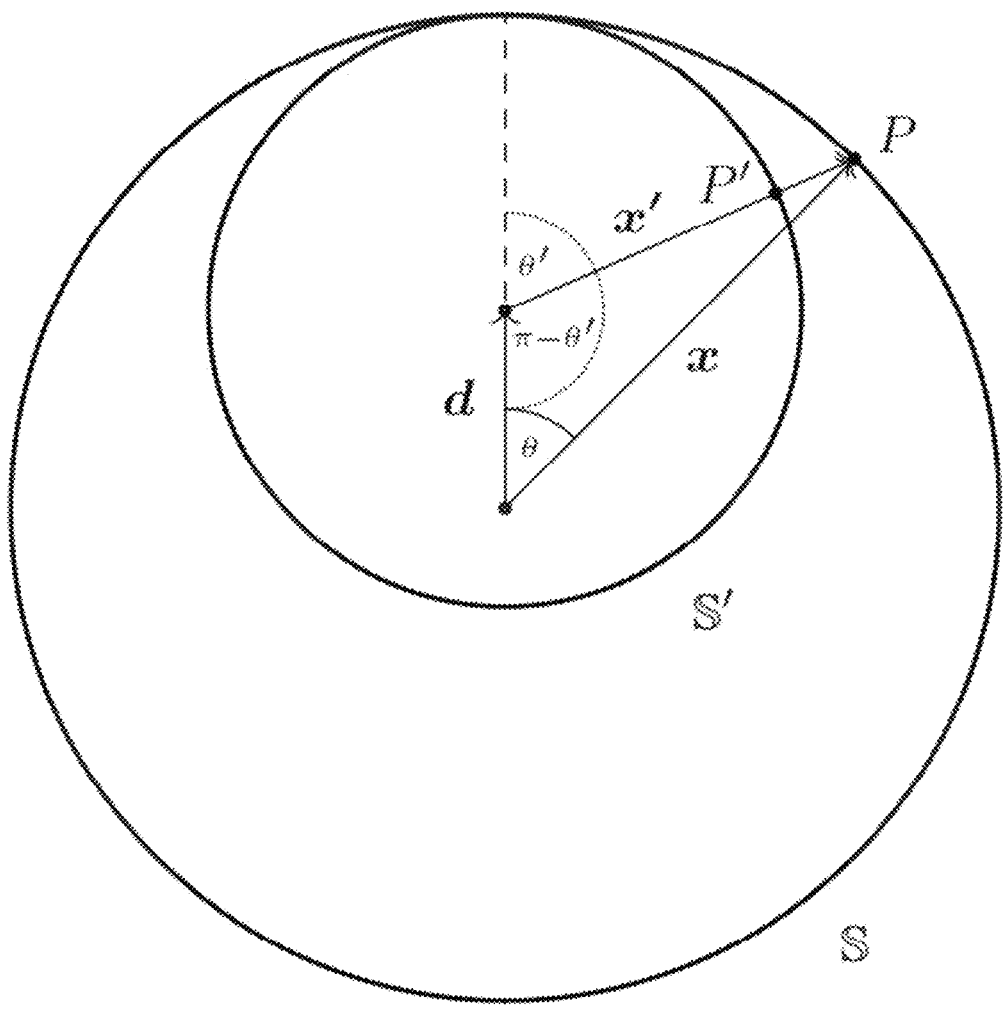
FIG. 2 illustrates the projection of surface of a sphere S onto the surface of a displaced sphere S', where the point P is mapped to P'.

One method of realizing the present invention is to consider the explicit reprojection of one spherical surface, as illustrated in FIG. 2. An explicit analytic expression mapping the point P to the displaced sphere can be derived as follows. A point P on the surface of a spherical model S can be projected onto the surface of a displaced spherical model S' at point P' as illustrated in FIG. 2. A ray is cast from the origin of the displayed spherical model S' to the point P on the original spherical model S. The projected point P' is recovered from the intersection of that ray and the spherical surface S'. In this manner the projection between P and P' can be recovered and represented analytically through trigonometric equations.

Spherical Modelling and Mapping

An alternative approach to realise the present invention is to explicitly construct a three dimensional spherical model (or warped/distorted spherical model) and project the asset onto the spherical model before synthesizing views of the model from different positions. To construct the spherical model various approaches can be considered, such as a three dimensional triangular mesh, for example. Various standard projections can then be considered to project the asset onto the spherical model depending on the data format of the original asset. For example, if the asset is stored in the common equirectangular format then a standard equiangular or cylindrical projection may be used. Once the asset has been mapped to the three dimensional spherical model, a synthetic camera can be placed at the centre of the spherical model to recover the original view of the asset. Various models can be considered for the synthetic camera model, such as a projective camera modelling, e.g. perspective effects, CCD (charge-coupled device) effects, etc. By simply moving the synthetic camera in such a way to mimic the user's physical motion, the impression of positional motion in the scene is achieved. To implement this approach in practice, standard graphics development programming languages or platforms can be leveraged, e.g. OpenGL, Unity, etc. These systems often have camera models, for example, that can be easily deployed to generate synthetic views of a three dimensional model.

In some embodiments, only the portion of a scene that is visible to a user wearing a VR headset is manipulated. As the user moves in the real world, whether that be translational motion, i.e. forwards, backwards, left, right, up or down, or rotational motion, i.e. yaw, pitch or roll, the scene is digitally modified to display equivalent motion in the scene as experienced by the user in the real world. Take for example, an adventure role-playing game based on 360° content, where the user is tasked to examine certain digital artefacts to find clues. If the artefact is on a table or book-shelf, for example, the tendency would be for the user to lean forwards or walk towards the object. This forwards motion would not be reflected in 360° content using conventional VR headsets and software. Using the systems and methods of the present invention, the portion of the scene visible to the user would be manipulated to synthesize or reproject the relevant portion of the scene and provide the effect of the user moving within the scene. The effect of motion provided by synthesization or reprojection of the portion of the scene has the effect of reducing cyber motion sickness and enhancing user experience. The in real life motion of the user can also be scaled such that a much greater in scene motion is perceived by the user in response to in real life motion. For example, a 10 cm forwards or backwards motion in real life may scale to 1 meter in scene motion.

The present invention is effected by way of a computer operated system comprising at least a processor and a memory coupled to the memory. The memory comprises computer readable instructions that, when executed, cause the processor to receive at least a portion of content for a virtual environment. The portion of content is manipulated in accordance with the methods described above to provide 6 DOF in immersive content.

While the aforegoing description focuses on light fields, i.e. photos and videos, the same invention can be applied to general 360° fields, including but not limited to sound fields, such as spatial audio.

The aforegoing description is provided by way of example only and is intended only to provide possible ways of realizing the present invention. It will be appreciated that the two methods outlined are not mutually exclusive and portions of each may be combined without departing from the scope of the invention.

The invention claimed is:

1. A method for providing with at least a portion of content having six degrees-of-freedom in a virtual environment, comprising
    receiving, by at least one processor, the portion of content for the virtual environment;
    associating, by the at least one processor, at least one of a first geometric shape and a second geometric shape with the portion of content;
    projecting, by the at least one processor, the portion of content onto a first point of a surface of the first geometric shape;
    determining, by the at least one processor, based on the projecting of the portion of content onto the first point, a first outcome relating to the portion of content at the first position;
    projecting, by the at least one processor, the portion of content onto a second point of the surface of the first geometric shape or of a surface of the second geometric shape, the second point being different than the first point, wherein the second point of the surface of the first geometric shape is projected onto the surface of the second geometric shape;
    determining, by the at least one processor, based on the projecting of the portion of content onto the second point, a second outcome relating to the portion of content at a second position in the virtual environment, the second position being different than the first position, wherein the determining of the first outcome or the determining of the second outcome comprises:
        dividing, by the at least one processor, the portion of content into a plurality of regions including a first and second foreground region and a first and second background region, wherein the first foreground region and the first background region is projected onto the first geometric shape and the second foreground region and the second background region is projected onto the second geometric shape such that the first geometric shape comprises the first foreground region and the first background region and the second geometric shape comprises the second foreground region and the second background region; and
        distorting, by the at least one processor, the first geometric shape and the second geometric shape; and
    reformatting, by the at least one processor and based on the first outcome and the second outcome, the portion of content to have six degrees-of-freedom providing rotational motion and positional motion in the virtual environment.

2. The method of claim 1, wherein the projecting of the portion of content onto the first point and the second point comprises:
    mapping, by the at least one processor, the portion of content onto the first point of the surface of the geometric surface, and
    mapping, by the at least one processor, the portion of content onto the second point of the surface of the first geometric shape or of the surface of the second geometric shape.

3. The method of claim 1, wherein the second point of the surface of the first geometric shape is further projected onto the first geometric shape and the first geometric shape is a three-dimensional sphere.

4. The method of claim 1, wherein each of the first geometric shape and the second geometric shape is a sphere, and wherein a center of the first geometric shape is displaced from a center of the second geometric shape.

5. The method of claim 1, wherein:
the second point is projected onto the surface of the first geometric shape and the surface of the second geometric shape, and
the determining of the second outcome is performed separately using the surface of the first geometric shape and the surface of the second geometric shape.

6. The method of claim 1, further comprising:
converting, by the at least one processor, the portion of content to provide 360° of information of the portion of content.

7. The method of claim 6, wherein:
the receiving the portion of content for the virtual environment comprises receiving the portion of content from a first camera and a second camera, and
the associating the at least one of the first geometric shape and the second geometric shape with the portion of content comprises associating at least one of the first geometric shape and the second geometric shape with the first camera and the second camera, respectively.

8. The method of claim 7, wherein the first camera or and the second camera is configured to move at a given velocity based on a direction of movement or a distance of an object, wherein each of the direction of movement and the distance of the object relates to a first point of reference and a second point of reference in the portion of the content for the virtual environment.

9. The method of claim 7, further comprising:
calibrating, by the at least one processor, the first moving camera or the second moving camera based on a distance of a first point of reference from an object at a second point of reference in the portion of the content for the virtual environment.

10. The method of claim 1, wherein the portion of content comprises one of a sound, an image, and a video.

11. The method of claim 1, wherein each of the first geometric shape and the second geometric shape is a sphere.

12. The method of claim 11, wherein the sphere is three-dimensional.

13. A system, comprising:
a memory comprising instructions; and
at least one processor coupled to the memory, wherein the instructions are configured to cause the processor to:
receive at least a portion of content for a virtual environment;
associate at least one of a first geometric shape and a second geometric shape with the portion of content;
project the portion of content onto a first point of a surface of the first geometric shape;
determine, based on the projection of the portion of content onto the first point, a first outcome relating to the portion of content at the first position;
project the portion of content onto a second point of the surface of the first geometric shape or of a surface of the second geometric shape, the second point being different than the first point;
determine, based on the projecting of the portion of content onto the second point, a second outcome relating to the portion of content at a second position in the virtual environment, the second position being different than the first position, wherein during at least one of the determine the first outcome and determine the second outcome, the processor is further configured to:
divide the portion of content into a plurality of regions including a first and second foreground region and a first and second background region, wherein the first foreground region and the first background region is projected onto the first geometric shape and the second foreground object and the second background object is projected onto the second geometric shape such that the first geometric shape comprises the first foreground region and the first background region and the second geometric shape comprises the second foreground region and the second background region; and
distort the first geometric and the second geometric shape; and
reformat, based on first outcome and the second outcome, the portion of content to have six degrees-of-freedom providing rotational motion and positional motion in the virtual environment.

14. The system of claim 13, wherein the second point of the surface of the first geometric shape is projected onto the first geometric shape and the first geometric shape is a three-dimensional spherical model.

15. The system of claim 13, wherein the second point of the surface of the first geometric shape is projected onto the surface of the second geometric shape.

16. The system of claim 13, wherein the portion of content comprises one of a sound, an image, and a video.

17. A tangible computer-readable device having instructions stored thereon that, when executed by at least one computing device, cause the at least one computing device to perform operations comprising:
receiving at least a portion of content for a virtual environment;
converting the portion of content to provide 360° of information of the portion of content, wherein the receiving the portion of content for the virtual environment comprises receiving the portion of content from a first camera and a second camera, wherein the first camera or and the second camera is configured to move at a given velocity based on a direction of movement or a distance of an object, and wherein each of the direction of movement and the distance of the object relates to a first point of reference and a second point of reference in the portion of the content for the virtual environment;
associating at least one of a first geometric shape and a second geometric shape with the portion of content, wherein associating the at least one of the first geometric shape and the second geometric shape with the portion of content comprises associating at least one of the first geometric shape and the second geometric shape with the first camera and the second camera, respectively;
projecting the portion of content onto a first point of a surface of the first geometric shape;
determining, based on the projection of the portion of content onto the first point, a first outcome relating to the portion of content at the first position;
projecting the portion of content onto a second point of the surface of the first geometric shape or of a surface of the second geometric shape, the second point being different than the first point;
determining, based on the projecting of the portion of content onto the second point, a second outcome relating to the portion of content at a second position in the virtual environment, the second position being different than the first position; and reformatting, based on the first outcome and the second outcome, the portion of content to have six degrees-of-freedom including rotational motion and positional motion in the virtual environment.

\* \* \* \* \*

UNITED STATES PATENT AND TRADEMARK OFFICE
CERTIFICATE OF CORRECTION

PATENT NO. : 10,902,554 B2
APPLICATION NO. : 16/402701
DATED : January 26, 2021
INVENTOR(S) : McEwen et al.

It is certified that error appears in the above-identified patent and that said Letters Patent is hereby corrected as shown below:

On the Title Page

Please add:
--(30) Foreign Application Priority Data
Oct. 26, 2018 (GB) .....................1817454.0--

Signed and Sealed this
Nineteenth Day of April, 2022

Katherine Kelly Vidal
*Director of the United States Patent and Trademark Office*